United States Patent

Shelhart et al.

(10) Patent No.: US 9,160,892 B1
(45) Date of Patent: Oct. 13, 2015

(54) INKJET PRINT HEAD PROTECTION BY SCANNING AND MOIRE ANALYSIS

(71) Applicant: Xerox Corporation, Norwalk, CT (US)

(72) Inventors: Timothy G. Shelhart, West Henrietta, NY (US); Aaron M. Moore, Fairport, NY (US); Samuel P. Sadtler, Brooklyn, NY (US); Donald R. Fess, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/632,219

(22) Filed: Feb. 26, 2015

(51) Int. Cl.
 *B41J 11/42* (2006.01)
 *H04N 1/60* (2006.01)
 *B41J 29/393* (2006.01)

(52) U.S. Cl.
 CPC ............. *H04N 1/6033* (2013.01); *B41J 29/393* (2013.01)

(58) Field of Classification Search
 CPC ...... B41J 11/008; B41J 11/0095; B41J 11/42; H04N 1/00002; H04N 1/00029; H04N 1/00045
 USPC ............ 347/14, 16, 19, 78, 81, 101, 104, 105
 See application file for complete search history.

(56) References Cited

U.S. PATENT DOCUMENTS 6,789,876 B2 * 9/2004 Barclay et al. .................. 347/37
8,891,128 B2 * 11/2014 Yamazaki ..................... 358/1.9

\* cited by examiner

*Primary Examiner* — Thinh Nguyen
(74) *Attorney, Agent, or Firm* — Hoffman & Baron, LLP

(57) ABSTRACT

A print head protection system is used in connection with an inkjet printer having a print head adapted for elevating. A projector upstream of the print head projects a reference pattern onto the media sheet. An imaging camera captures a digital image of the projected pattern. An analyzer compares the digital image of the projected pattern with the reference pattern. If moiré fringes are detected, the moiré fringes are analyzed for media sheet curl. An error signal is created when the sheet curl exceeds a predetermined distance above the process path. A mitigation control raises the print head to preclude damage in response to the signal. Alternately, the sheet can be discarded.

22 Claims, 4 Drawing Sheets

INKJET PRINT HEAD PROTECTION BY SCANNING AND MOIRE ANALYSIS

INCORPORATION BY REFERENCE

Not applicable.

TECHNICAL FIELD

This invention relates to inkjet digital printing machines, and, more particularly, to an apparatus, system, and method for protecting the printing head from damage due to impaction of media sheets by measuring media distortion with moiré analysis.

BACKGROUND

Digital printing machines can take on a variety of configurations. One common process is that of electrostatographic printing, which is carried out by exposing a light image of an original document to a uniformly charged photoreceptive member to discharge selected areas. A charged developing material is deposited to develop a visible image. The developing material is transferred to a medium sheet (paper) and heat fixed.

Another common process is that of direct to paper ink jet printing systems. In ink jet printing, tiny droplets of ink are sprayed onto the paper in a controlled manner to form the image. Other processes are well known to those skilled in the art. The primary output product for a typical digital printing system is a printed copy substrate such as a sheet of paper bearing printed information in a specified format.

The output sheet can be printed on one side only, known as simplex, or on both sides of the sheet, known as duplex printing. In order to duplex print, the sheet is fed through a marking engine to print on the first side, then the sheet is inverted and fed through the marking engine a second time to print on the reverse side. The apparatus that turns the sheet over is called an inverter.

FIG. 1 shows a state-of-the-art inkjet digital printing machine 20. Printer 20 includes a marking module or engine 22 having an ink jet print head or multiple print heads 23, disposed centrally on the marking engine 22, and facing downward. Printer 20 has a media path 24 along which the media sheet 34 moves, and a media path entrance 26 where sheets are fed into the printer by a media sheet feeder (not shown). Printer 20 also has a media path exit 28 where sheets leave the printer and are fed into a finisher (not shown). Printer 20 has an inverter 30 to turn the sheet over for duplex printing. A media sheet 34 leaving the inverter 30 follows arrow 32 back to the marking engine 22 for printing on the reverse side. Arrows 26 and 28 also indicate the process path direction, which is downstream from entrance 26 toward exit 28.

In cut sheet printing devices, under certain conditions, the lead-edge of the paper can curl up and have potential for separating from the marking transport and contact the print head. A sheet with out-of-spec flatness can occur when a duplexed sheet has a heavy ink image on the trail edge of side 1, which then becomes the lead edge when inverted and curls towards Side 2. This is most severe when the paper is thin, and the cross-process direction image is parallel to the grain direction of the paper (Example: letter size paper, grain-long, long-edge-feed).

In direct-to-paper ink jet marking engines, an ink jet print head is mounted such that the face (where the ink nozzles are located) is mounted a fixed distance from the surface of the media. The gap is typically 1 mm or less. Because the paper curl height can be several millimeters, it poses a risk to the print head because it can hit the print head face plate when it passes through the nominally thin gap that the print heads are spaced from the media.

Media sheets, typically paper, can curl or distort in several ways. LE curl is a concave upward bending along the process direction, such that the lead edge (LE) and the trail edge (TE) rise up off the transport, as shown in FIG. 2. The raised LE can impact multiple print heads across the paper width. Cross curl is a concave upward bending across the process direction, such that the left side and right side edges rise up off the transport, as shown in FIG. 3. The raised sides can impact multiple print heads. Both LE curl and cross curl are caused by ink on the first side of a duplex print that is inverted.

Dog ear is a crease with upward bending across the process direction at an angle across a corner, as shown in FIG. 4. The crease can impact multiple print heads downstream. This is caused by sheet damage in the paper path. Print head damage is severe due to greater pressure.

Cockle is multiple bumps or peaks distributed throughout the sheet, as shown in FIG. 5. The bumps can impact multiple print heads downstream. Cockle is caused by the drying rate of ink, especially aqueous based inks.

For ideal image quality, the print head gap or distance of the print head to the sheet should be maintained at less than 1.2 mm, preferably within 1 mm. The media sheet traveling at one meter per second must pass freely under the print heads. The sheet must not contact the face of the print head, or serious damage will result. This requirement poses a challenge for cut sheet media since the corners, edges and body of the sheet may not be completely flat. The use of a hold down transport such as a vacuum conveyor helps to maintain the sheet flat and within the gap for the most part. Purposely delivering sheets with downward curl from the sheet supply tray also helps to hold the sheet flat. Nevertheless it is not guaranteed that a sheet is flat over the entire surface.

Ink jet print heads are very delicate and can easily be damaged if the face of the print head is contacted by the media which is passing nearby. The print heads are also very expensive. Thus, it is very important to minimize any risk of damaging these print heads.

Accordingly, there is a need to provide a print head protection device for inkjet printers that will detect media sheet curl and take remedial action to prevent print head damage.

There is a further need to provide a print head protection device for inkjet printers of the type described and that will match the high production rate of a digital printing machine.

There is a yet further need to provide a print head protection device for inkjet printers of the type described and that is mechanically simple and robust, thereby minimizing cost.

SUMMARY

In one aspect, a print head protection system is for use in connection with an inkjet printer having an inkjet print head, which is adapted for elevating. A media sheet has a lead edge and a trail edge. The media sheet moves in a process direction along a process path. The print head protection system comprises a projector disposed upstream of the print head for projecting a reference pattern onto the media sheet as a projected pattern. The projected pattern is at a predetermined position along the process path. An imaging camera captures a digital image of the projected pattern at the predetermined position.

An analyzer compares the digital image of the projected pattern with the reference pattern. If moiré fringes are detected, the moiré fringes are analyzed for media distortion. An error signal is created when distortion exceeds an acceptable limit. A mitigation control is operative to mitigate print head damage in response to the signal.

In another aspect, a print head protection system is for use in connection with an inkjet printer having an inkjet print head, which is adapted for elevating (moving the jetting surface of the print head away from the media). A media sheet has a lead edge and a trail edge. The media sheet moves in a process direction along a process path The print head protection system comprises a projector disposed upstream of the print head for projecting a digital file reference pattern onto the media sheet as an optical image projected pattern. The projected pattern is at a predetermined position along the process path. An imaging camera captures a digital image of the projected pattern at the predetermined position.

An analyzer compares the digital image of the projected pattern with the reference pattern. If moiré fringes are detected, the moiré fringes are analyzed for media sheet curl. An error signal is created when the sheet curl exceeds a predetermined distance above the process path. A mitigation control is operative to mitigate print head damage in response to the signal.

In yet another aspect, a method for print head protection is disclosed, and is for use in connection with an inkjet printer having an inkjet print head, which is adapted for elevating. A media sheet has a lead edge and a trail edge. The media sheet moves in a process direction along a process path. The method comprises providing a projector upstream of the print head. A reference pattern is projected onto the media sheet as an optical image projected pattern with the projector. The projected pattern is projected at a predetermined position along the process path. An imaging camera is provided adjacent the projector.

A digital image of the projected pattern is captured with the imaging camera. The digital image of the projected pattern is compared with the reference pattern. A composite image of the projected pattern and the reference pattern is generated. It is determined if moiré fringes are present in the composite image. In the event that moiré fringes are not present, printing is continued. In the event that moiré fringes are present, the moiré fringes are analyzed for media sheet curl. An amplitude of media sheet curl is determined. The amplitude of media sheet curl is compared with a print head gap. An error signal is created when the sheet curl exceeds a predetermined distance above the process path. Print head damage is mitigated in response to the signal. When the sheet curl does not exceed the predetermined distance above the process path, printing is continued.

These and other aspects, objectives, features, and advantages of the disclosed technologies will become apparent from the following detailed description of illustrative embodiments thereof, which is to be read in connection with the accompanying drawings.

DETAILED DESCRIPTION

Figure 1:
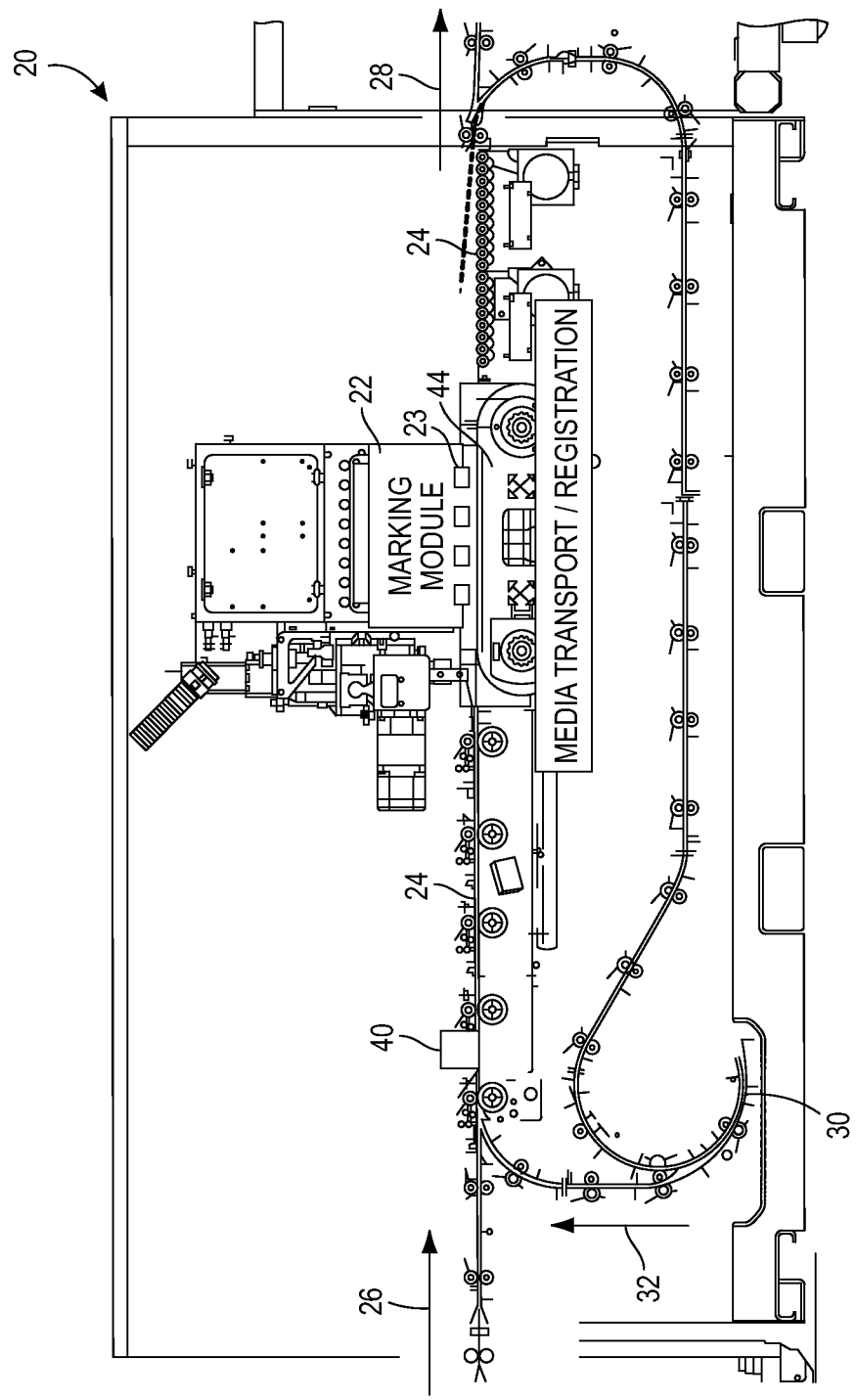
FIG. 1 is a schematic side elevational, sectional view of an exemplary production printer showing a print head protection system.
Figure 2:
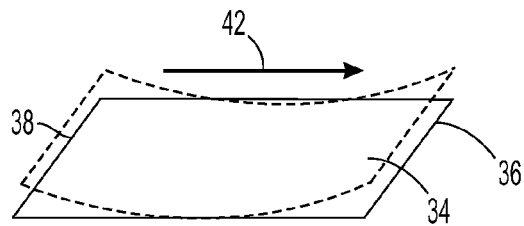
FIG. 2 is a schematic isometric view of a media sheet showing LE curl.
Figure 3:
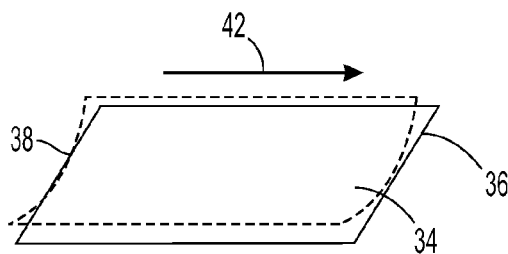
FIG. 3 is a schematic isometric view of a media sheet showing cross curl.
Figure 4:
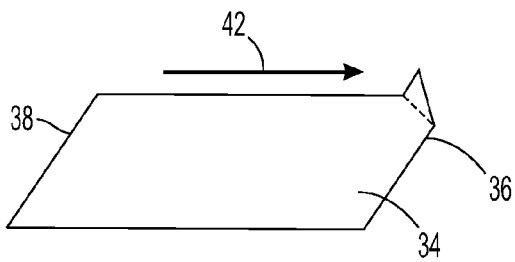
FIG. 4 is a schematic isometric view of a media sheet showing dog ear.
Figure 5:
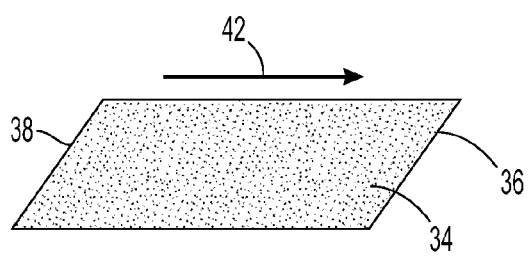
FIG. 5 is a schematic isometric view of a media sheet showing cockle.

Describing now in further detail these exemplary embodiments with reference to the Figures as described above, the print head protection system is typically used in a select location or locations of the paper path or paths of various conventional media handling assemblies. Thus, only a portion of an exemplary media handling assembly path is illustrated herein. It should be noted that the drawings herein are not to scale.

As used herein, a "printer," "printing assembly" or "printing system" refers to one or more devices used to generate "printouts" or a print outputting function, which refers to the reproduction of information on "substrate media" or "media substrate" or "media sheet" for any purpose. A "printer," "printing assembly" or "printing system" as used herein encompasses any apparatus, such as a digital copier, bookmaking machine, facsimile machine, multi-function machine, etc. which performs a print outputting function.

A printer, printing assembly or printing system can use an "electrostatographic process" to generate printouts, which refers to forming and using electrostatic charged patterns to record and reproduce information, a "xerographic process", which refers to the use of a resinous powder on an electrically charged plate to record and reproduce information, or other suitable processes for generating printouts, such as an ink jet process, a liquid ink process, a solid ink process, and the like. Also, such a printing system can print and/or handle either monochrome or color image data.

As used herein, "media substrate" or "media sheet" refers to, for example, paper, transparencies, parchment, film, fabric, plastic, photo-finishing papers or other coated or non-coated substrates on which information can be reproduced, preferably in the form of a sheet or web. While specific reference herein is made to a sheet or paper, it should be understood that any media substrate in the form of a sheet amounts to a reasonable equivalent thereto. Also, the "leading edge" or "lead edge" (LE) of a media substrate refers to an edge of the sheet that is furthest downstream in the process direction.

As used herein, a "media handling assembly" refers to one or more devices used for handling and/or transporting media substrate, including feeding, printing, finishing, registration and transport systems.

As used herein, the terms "process" and "process direction" refer to a procedure of moving, transporting and/or handling a substrate media sheet. The process direction is a flow path the sheet moves in during the process.

As used herein, a moiré pattern, or fringe, is an optical interference pattern created when two identical reference patterns on a flat or curved surface are overlaid one on top of the other, while displaced or rotated a small amount from one another. The reference patterns may be transparencies that are directly superimposed or projected optically upon a surface. The reference patterns may also be in the format of digital files that are projected optically. The resulting moiré pattern can be imaged and analyzed digitally. Typical reference patterns can be closely spaced straight lines drawn radiating from a point, or parallel lines in the form of a grid. However, many different reference patterns can be utilized. Analysis of the moiré pattern can reveal whether the surface is flat or distorted out of plane, and by what amplitude.

Figure 6:
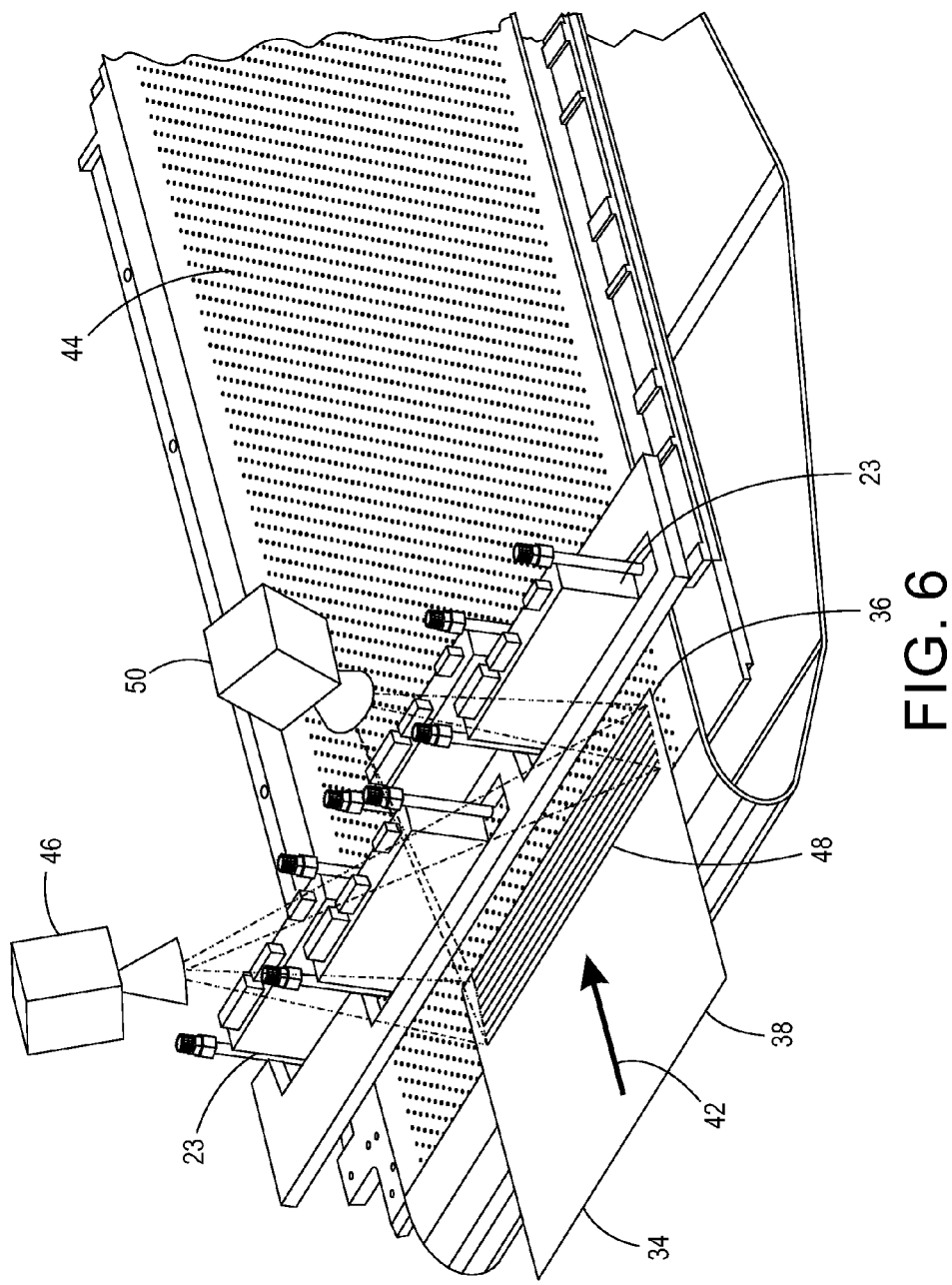
FIG. 6 is a schematic top plan view of the print head protection system of FIG. 1 with an incoming media sheet.

Referring to FIGS. 1 and 6, a print head protection system 40 is for use in connection with an inkjet printer 20 having an inkjet print head 23, or an array of print heads 23, which is located on a marking module or engine 22, which is adapted for elevating (moving the jetting surface of the print heads 23 upward, away from the media sheet 34). A media sheet 34 has a lead edge 36 and a trail edge 38. The media sheet 34 moves in a process direction (from left to right in the drawings) shown by arrow 42, along a process path 24 on a sheet transport 44, such as a vacuum transport. Other transport devices are shown, such as nip rollers, and are well known to those skilled in the art.

The print head protection system 40 comprises a projector 46 disposed upstream of the print head 23. The projector 46 projects a reference pattern onto the media sheet as an optical image projected pattern 48. The reference pattern is preferably a digital file stored in the memory of a computer (not shown). The projector 46 converts the digital file to an optical image which is then projected onto the media sheet as a visible projected pattern 48. Alternatively, the reference pattern can be a print on an opaque substrate from which light is reflected. The reference pattern can be a transparency (slide) through which light is transmitted. The projected pattern 48 is at a predetermined position along the process path 24.

An imaging camera 50 captures a digital image of the visible projected pattern 48 at the predetermined position. The imaging camera 50 outputs a digital file of the projected pattern 48, which is sent to the computer (not shown) for analysis.

An analyzer is provided, and can be embodied in hardware and/or software. The analyzer preferably includes an algorithm adapted to be executed on the computer. The analyzer compares the digital image of the projected pattern with the reference pattern. The process is similar to that of manually overlaying a reference transparency pattern on a printed test pattern. If the patterns are not identical, moiré fringes will appear, indicating that the test pattern is distorted with respect to the reference pattern.

In the printer 20, a flat media sheet 34 will reflect an undistorted projected pattern 48 to the imaging camera 50. The digital image of the undistorted projected pattern is compared with the reference pattern. From this, a composite image is generated composed of the projected pattern and the reference pattern "overlayed" digitally upon one another. Since the projected pattern is undistorted, no moiré fringes are present in the composite image. This indicates that the media sheet 34 is flat, and can safely pass beneath the print heads 23. The distortion acceptable limit includes a sheet curl predetermined distance above the process path.

A media sheet 34 that is distorted out of the plane of the process path 24, as is the case with media sheet curl described above, will reflect a distorted projected pattern 48 to the imaging camera 50. From this, the composite image is generated composed of the distorted projected pattern and the reference pattern. Since the images are not identical, moiré fringes are present in the composite image. The comparison and generated composite image can be implemented with hardware and/or software. Preferably, the analysis is done digitally in the computer by means well known to those having skill in the art.

If moiré fringes are detected, the moiré fringes are analyzed for media sheet curl. An approximate magnitude of sheet curl can be determined. An error signal is created when the sheet curl exceeds a predetermined distance above the plane of the process path. The sheet curl predetermined distance above the process path is preferably within the range of 0.50 mm to 1.0 mm. Alternatively, the sheet curl predetermined distance can be within the range of 0.40 mm to 2.0 mm, or within the range of 0.30 mm to 3.0 mm.

A mitigation control to prevent print head damage is provided. The mitigation control is operative in response to the signal. The mitigation control can be embodied in hardware and/or software, and sensitive to any type of input signal. The mitigation control can be operative of any mechanical element associated with the sheet path. The protection system 40 will be mounted significantly upstream of the marking module 22 (while still in the duplex path) such that a sheet determined to be out-of-spec by the system can be mitigated before coming in contact w/ the print heads 23.

The mitigation typically will include one of several procedures. Firstly, the mitigation control can halt sheet feeding in response to the signal. The curled sheet is manually removed from the process path. Printing is then resumed.

Secondly, the print head 23 can be elevated in response to the signal. The curled sheet 34 then passes below the raised print head 23, while receiving additional printing. The print head drawer, which is mounted on vertical slides, could be raised slightly (perhaps as much as 5 mm) to allow the out-of-spec paper to pass through without contacting the print head. This results in slight distortion of the printed image, which is not necessarily objectionable.

Thirdly, the media sheet 34 can be directed away from the process path 24 in response to the signal. The media sheet 34 is then moved to a tray (not shown) for waste.

Figure 7:
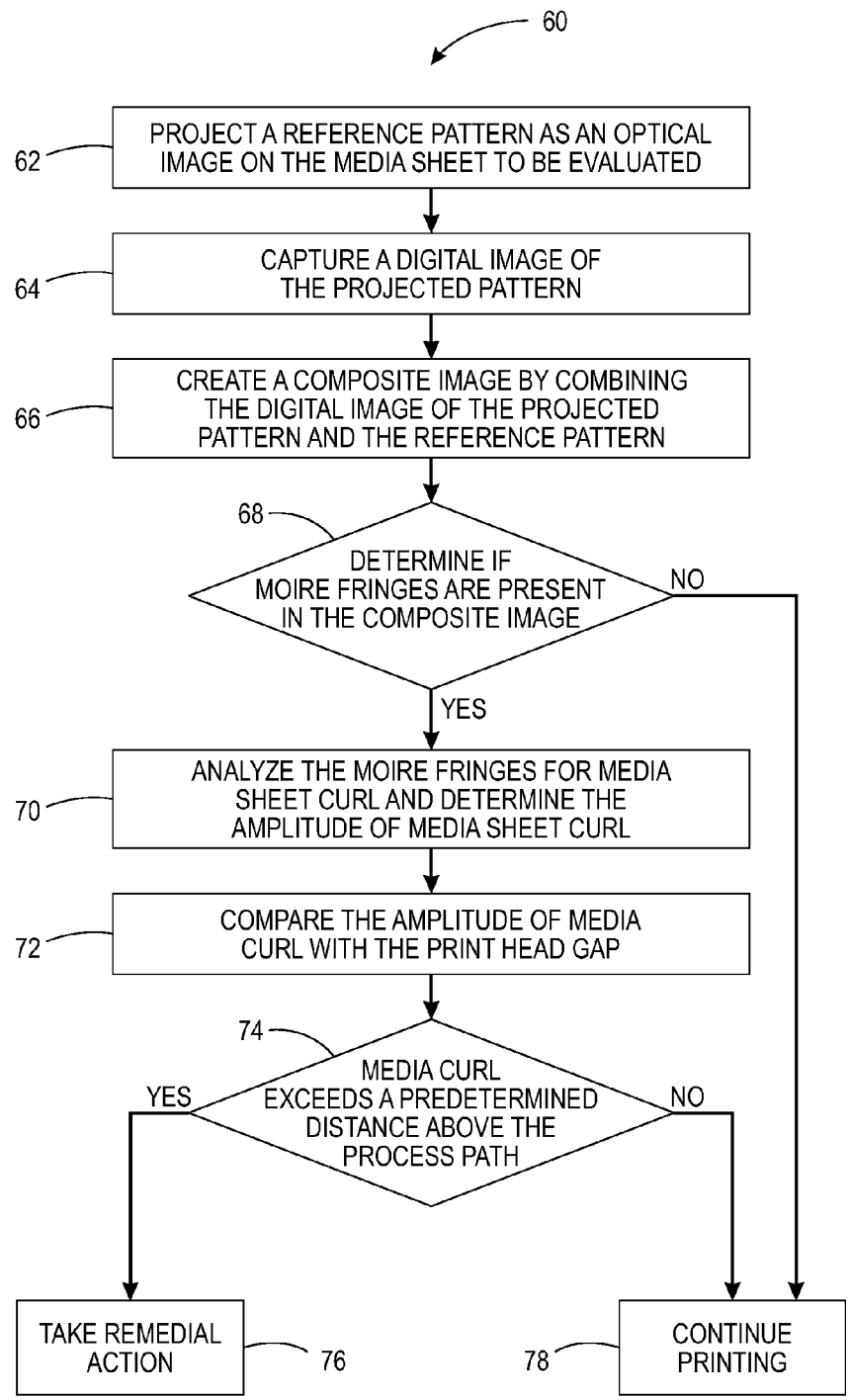
FIG. 7 is a flow chart showing the method of practicing the print head protection system of FIG. 1.

A method for print head protection is disclosed, and is for use in connection with an inkjet printer 20 having an inkjet print head 23, which is adapted for elevating. A media sheet 34 has a lead edge 36 and a trail edge 38. The media sheet 34 moves in a process direction 42 along a process path 24. The steps are indicated on the flow chart FIG. 7, at 60. The method comprises providing a projector 46 upstream of the print head 23. A reference pattern is projected onto the media sheet as an optical image projected pattern 48 with the projector 46 (step 62). The projected pattern 48 is projected at a predetermined position along the process path 24. An imaging camera 50 is provided adjacent the projector 46.

A digital image of the projected pattern is captured with the imaging camera 50 (step 64). The digital image of the projected pattern is compared with the reference pattern. A composite image of the projected pattern 48 and the reference pattern is generated (step 66). Determine if moiré fringes are present in the composite image (step 68). If "yes", then moiré fringes are present, and the moiré fringes are analyzed for media sheet curl. Amplitude of the media curl is determined by an algorithm (step 70). Amplitude of the media curl is compared with the print head gap (step 72). If "no", then moiré fringes are not present, and printing is continued (step 78).

If moiré fringes are present, determine if the sheet curl exceeds a predetermined distance above the process path (step 74). If "yes", then remedial action is taken, and print head damage is mitigated in response to the signal (step 76). If "no", then the sheet curl does not exceed the predetermined distance above the process path, no error signal is created, and printing is continued (step 78).

Mitigating print head damage can comprise halting sheet feeding in response to the signal. Alternatively, mitigating print head damage can comprise elevating the print head in response to the signal, or directing the media sheet away from the process path in response to the signal.

The reference pattern can comprise a transparency, projected as with a traditional slide projector. Alternatively, the reference pattern can comprise a digital file. The digital file is converted into an optical image with a digital projector. The apparatus and method is well known to those skilled in the art.

The sheet curl predetermined distance above the process path is preferably within the range of 0.50 mm to 1.0 mm.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A print head protection system for use in connection with an inkjet printer having an inkjet print head, the print head being adapted for elevating, and a media sheet having a lead edge and a trail edge, the media sheet moving in a process direction along a process path, the print head protection system comprising:
    a projector disposed upstream of the print head for projecting a reference pattern onto the media sheet as a projected pattern, the projected pattern being at a predetermined position along the process path;
    an imaging camera for capturing a digital image of the projected pattern at the predetermined position;
    an analyzer for comparing the digital image of the projected pattern with the reference pattern, detecting moiré fringes, analyzing the moiré fringes for media distortion, and creating an error signal when distortion exceeds an acceptable limit; and
    a mitigation control operative to mitigate print head damage in response to the signal.

2. The print head protection system of claim 1, further comprising:
    the projected pattern is an optical image; and
    the reference pattern is a digital file.

3. The print head protection system of claim 1, further comprising:
    the projected pattern is an optical image; and
    the reference pattern is a transparency.

4. The print head protection system of claim 1, wherein the mitigation control is adapted to halt sheet feeding in response to the signal.

5. The print head protection system of claim 1, wherein the mitigation control is adapted to elevate the print head in response to the signal.

6. The print head protection system of claim 1, wherein the mitigation control is adapted to direct the media sheet away from the process path in response to the signal.

7. The print head protection system of claim 1, further comprising:
    the distortion includes sheet curl;
    the distortion acceptable limit includes a sheet curl predetermined distance above the process path; and
    the error signal indicates an approximate magnitude of sheet curl so as to implement mitigation.

8. The print head protection system of claim 7, wherein the sheet curl predetermined distance above the process path is within the range of 0.50 mm to 1.0 mm.

9. The print head protection system of claim 7, wherein the sheet curl predetermined distance above the process path is within the range of 0.40 mm to 2.0 mm.

10. The print head protection system of claim 7, wherein the sheet curl predetermined distance above the process path is within the range of 0.30 mm to 3.0 mm.

11. A print head protection system for use in connection with an inkjet printer having an inkjet print head, the print head being adapted for elevating, and a media sheet having a lead edge and a trail edge, the media sheet moving in a process direction along a process path, the print head protection system comprising:
    a projector disposed upstream of the print head for projecting a digital file reference pattern onto the media sheet as an optical image projected pattern, the projected pattern being at a predetermined position along the process path;
    an imaging camera for capturing a digital image of the projected pattern at the predetermined position;
    an analyzer for comparing the digital image of the projected pattern with the reference pattern, detecting moiré fringes, analyzing the moiré fringes for media sheet curl, and creating an error signal when the sheet curl exceeds a predetermined distance above the process path; and
    a mitigation control operative to mitigate print head damage in response to the signal.

12. The print head protection system of claim 11, wherein the mitigation control is adapted to halt sheet feeding in response to the signal.

13. The print head protection system of claim 11, wherein the mitigation control is adapted to elevate the print head in response to the signal.

14. The print head protection system of claim 11, wherein the mitigation control is adapted to direct the media sheet away from the process path in response to the signal.

15. The print head protection system of claim 11, wherein the sheet curl predetermined distance above the process path is within the range of 0.50 mm to 1.0 mm.

16. A method for print head protection for use in connection with an inkjet printer having an inkjet print head, the print head being adapted for elevating, and a media sheet having a lead edge and a trail edge, the media sheet moving in a process direction along a process path, the method comprising:
    providing a projector upstream of the print head;
    projecting a reference pattern onto the media sheet as an optical image projected pattern with the projector;
    projecting the projected pattern at a predetermined position along the process path;
    providing an imaging camera adjacent the projector;
    capturing a digital image of the projected pattern with the imaging camera;
    comparing the digital image of the projected pattern with the reference pattern and generating a composite image of the projected pattern and the reference pattern;
    determining if moiré fringes are present in the composite image;
    continuing printing in the event that moiré fringes are not present;
    analyzing the moiré fringes for media sheet curl, in the event that moiré fringes are present;
    determining an amplitude of media sheet curl;
    comparing the amplitude of media sheet curl with a print head gap;
    creating an error signal when the sheet curl exceeds a predetermined distance above the process path;
    mitigating print head damage in response to the signal; and
    continuing printing when the sheet curl does not exceed the predetermined distance above the process path.

17. The method of claim 16, wherein the reference pattern further comprises a transparency.

18. The method of claim 16, wherein the reference pattern further comprises a digital file.

19. The method of claim 16, wherein the mitigating print head damage further comprises halting sheet feeding in response to the signal.

20. The method of claim 16, wherein the mitigating print head damage further comprises elevating the print head in response to the signal.

21. The method of claim 16, wherein the mitigating print head damage further comprises directing the media sheet away from the process path in response to the signal.

22. The method of claim 16, wherein the sheet curl predetermined distance above the process path is within the range of 0.50 mm to 1.0 mm.

\* \* \* \* \*